May 30, 1944.  E. L. MALHIOT  2,349,878
ASSEMBLING APPARATUS
Filed Nov. 17, 1942  4 Sheets-Sheet 4
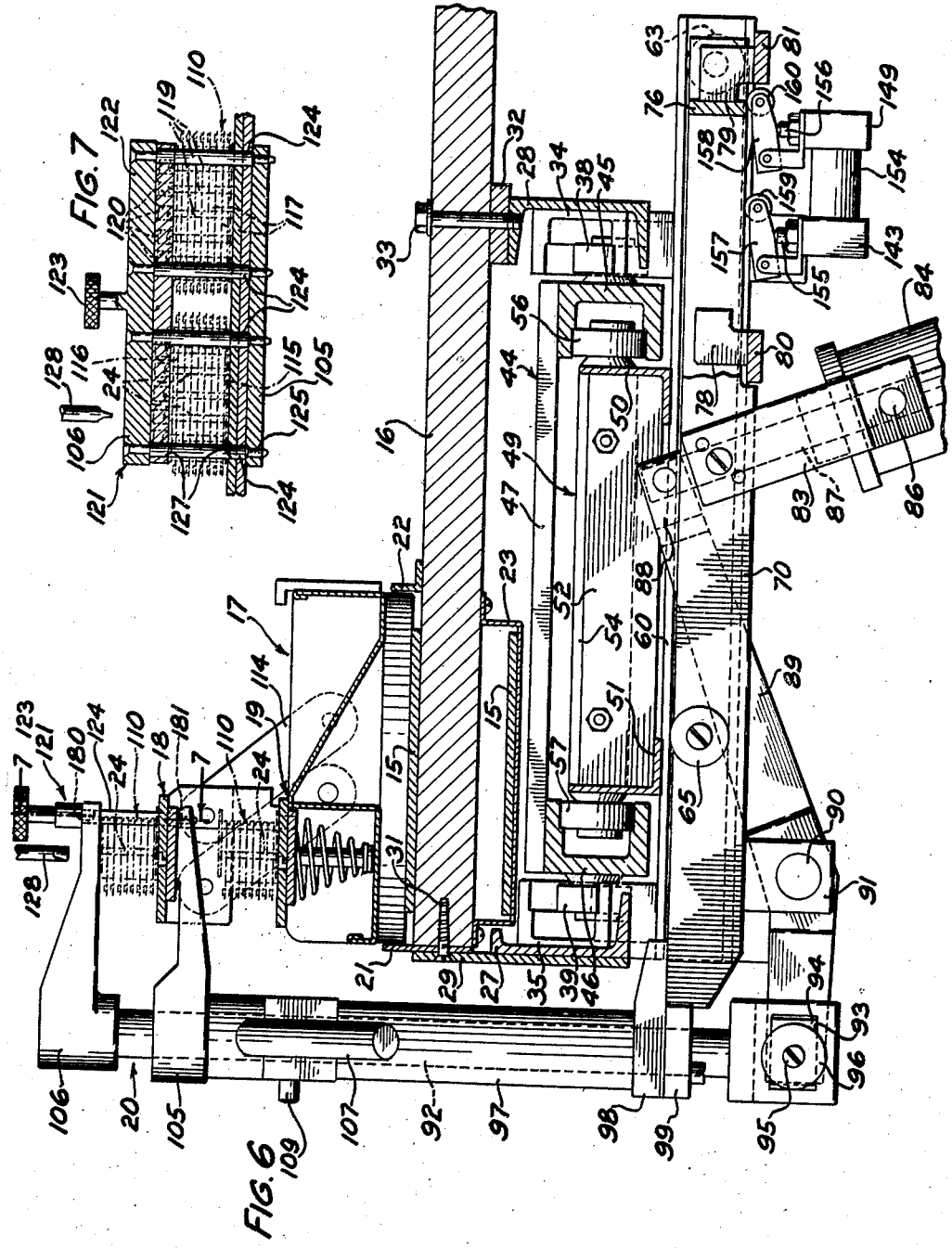
INVENTOR
E. L. MALHIOT
BY Harry L. Duft
ATTORNEY Patented May 30, 1944

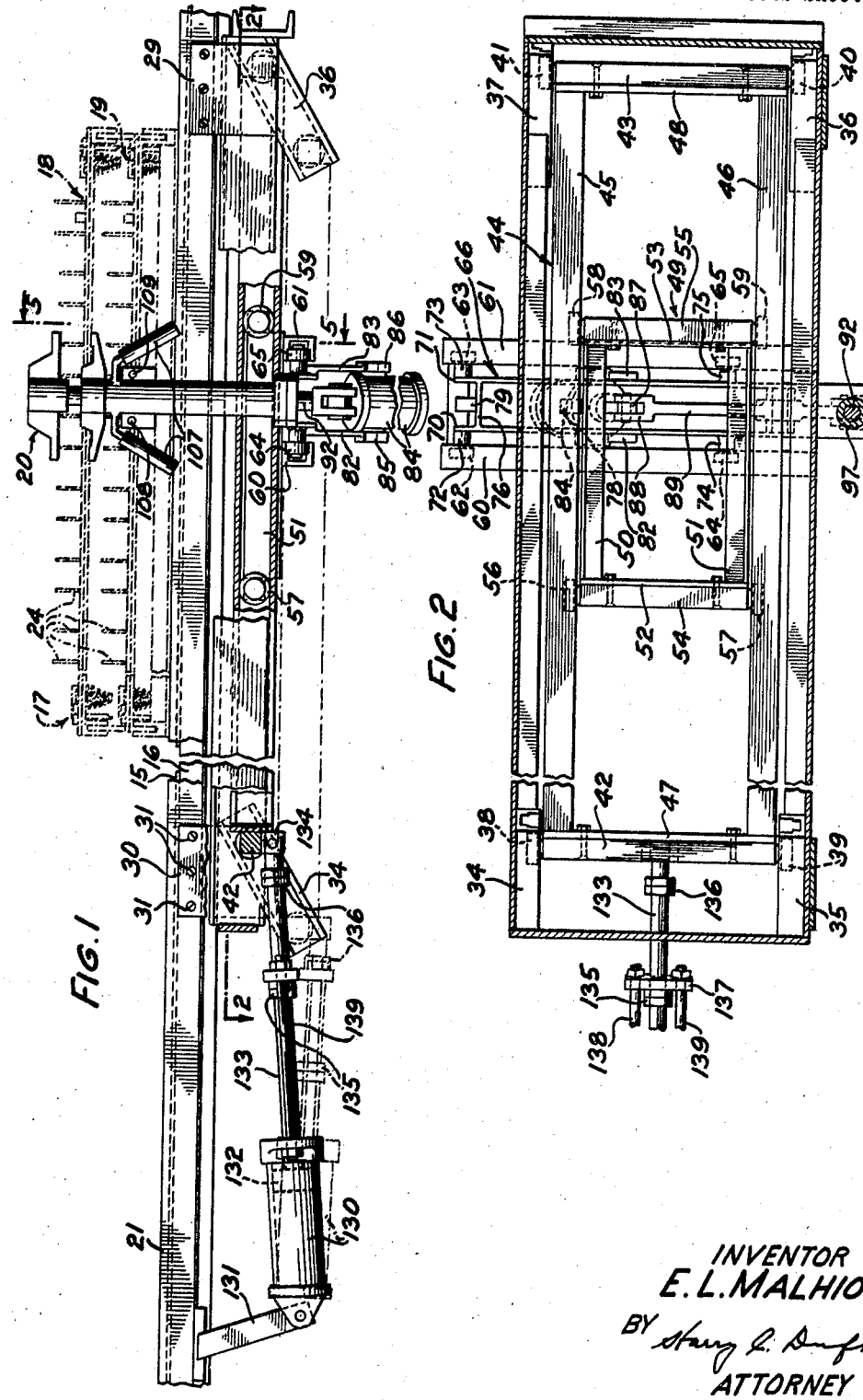
May 30, 1944.  E. L. MALHIOT  2,349,878
ASSEMBLING APPARATUS
Filed Nov. 17, 1942  4 Sheets-Sheet 1
INVENTOR
E. L. MALHIOT
BY
ATTORNEY May 30, 1944.　　　E. L. MALHIOT　　　2,349,878
ASSEMBLING APPARATUS
Filed Nov. 17, 1942　　　4 Sheets-Sheet 2
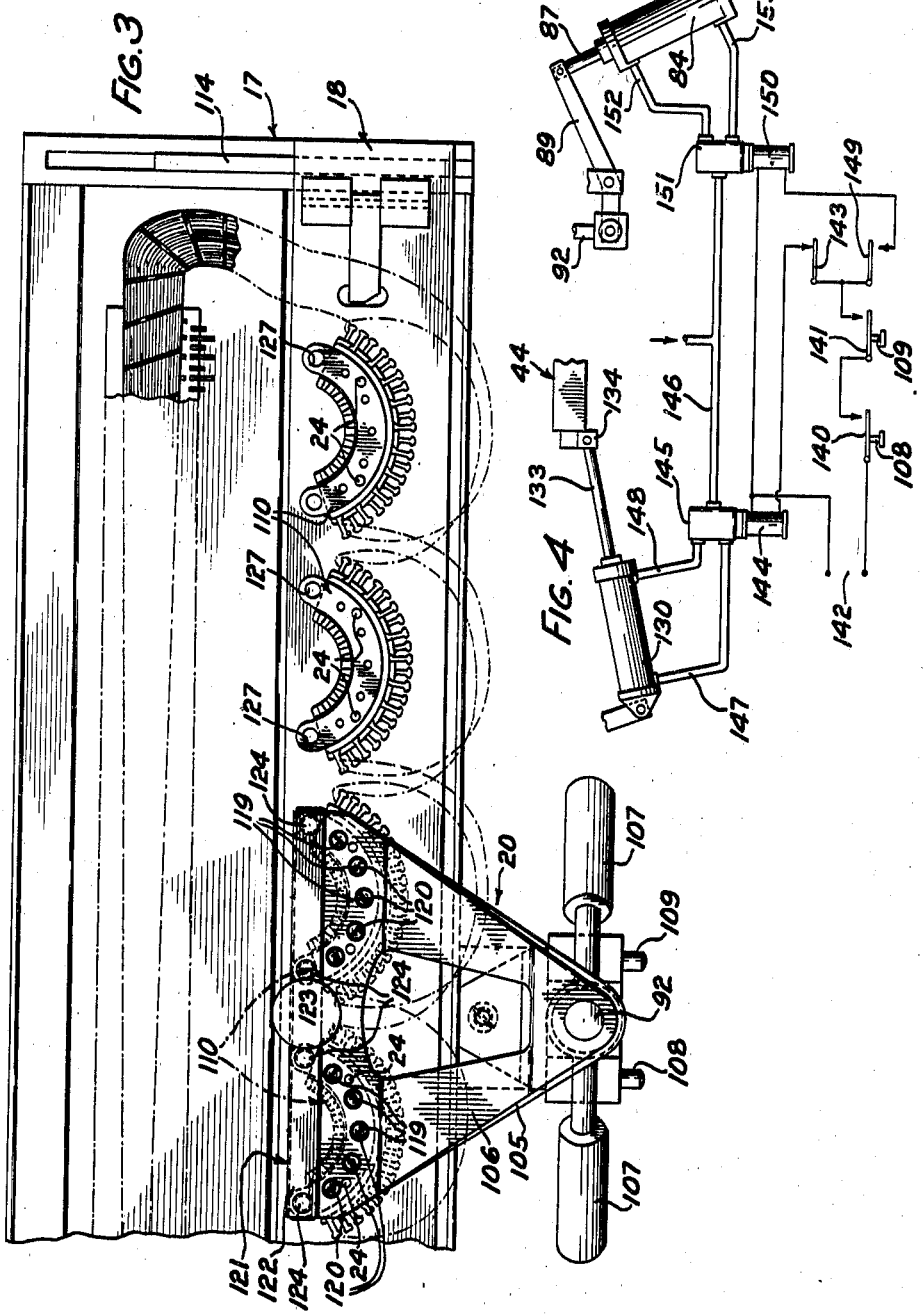
INVENTOR
E. L. MALHIOT
BY
ATTORNEY

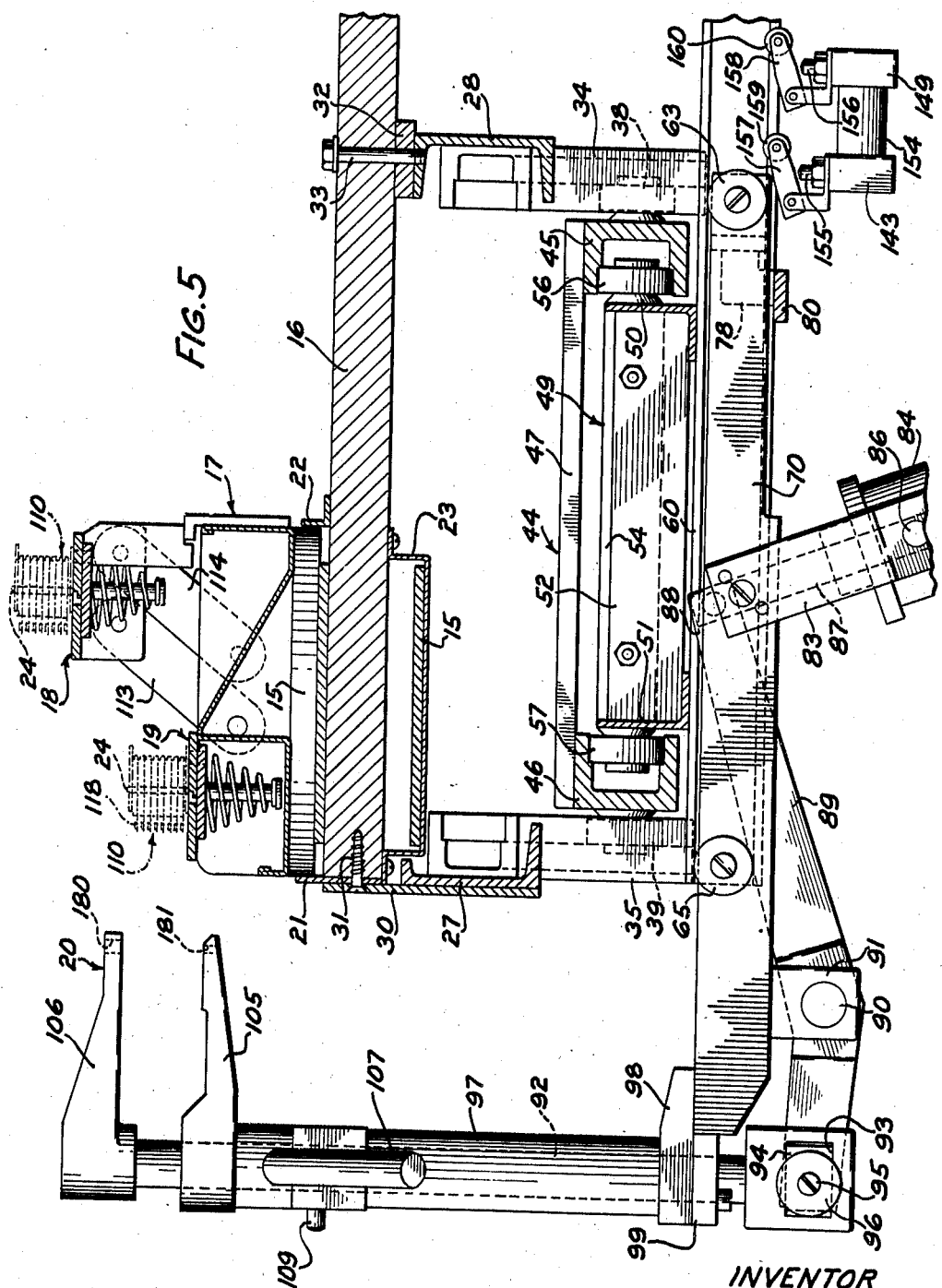

2,349,878

UNITED STATES PATENT OFFICE 2,349,878

ASSEMBLING APPARATUS

Eugene L. Malhiot, Maywood, Ill., assignor to Western Electric Company, Incorporated, New York, N. Y., a corporation of New York Application November 17, 1942, Serial No. 465,941

6 Claims. (Cl. 29—84)

This invention relates to assembling apparatus and more particularly to a compressing apparatus for use in compressing articles so that they may be fixed together in a predetermined relation.

It is an object of the present invention to provide an apparatus for compressing articles while they are being attached together.

In accordance with one embodiment of the invention, apparatus is provided for compressing step by step switch assemblies which are mounted on two different levels of a fixture travelling on a conveyor. In the apparatus, a compressing means is movable along the conveyor and transversely of the conveyor in addition to being shiftable to association with articles on either level of the fixture. Fluid actuated mechanisms are provided for operating the compressing means and for shifting it to either level of the fixture.

A better understanding of the invention may be had by reference to the following detailed description when considered in conjunction with the accompanying drawings, wherein Fig. 1 is a front elevational view of a section of a conveyor system having a movable compressing apparatus made in accordance with the present invention associated therewith;

Fig. 2 is a fragmentary horizontal sectional view taken substantially along the line 2—2 of Fig. 1 in the direction of the arrows;

Fig. 3 is an enlarged fragmentary plan view of an article carrier with a compressing fixture associated with it;

Fig. 4 is a schematic diagram of the controls and driving mechanisms for the compressing fixture;

Fig. 5 is a fragmentary vertical sectional view taken substantially along the line 5—5 of Fig. 1 in the direction of the arrows and showing on an enlarged scale the compressing fixture in its lower position and out of association with the lower level of articles to be compressed;

Fig. 6 is a view similar to Fig. 5 showing the compressing mechanism in position to operate on an upper level of articles to be compressed; and Fig. 7 is a fragmentary detail sectional view taken substantially along the line 7—7 of Fig. 6 in the direction of the arrows showing the manner in which the compressing fixture is aligned with the article.

Referring to the drawings, wherein like reference characters designate the same parts throughout the several views, there is shown in Fig. 1 a conveyor belt 15 which is movable across the top of a supporting table 16 to carry an article assembling fixture shown in dot and dash lines and designated by the reference numeral 17 through the apparatus. The fixture 17 has upper and lower assembling sections 18 and 19 with which a compressing mechanism 20, made in accordance with the present invention, may be associated at the will of an operator. The fixture 17 may be of any suitable type that carries banks of step by step switches at two levels and the fixture disclosed and claimed in my co-pending application, Serial No. 465,940, filed November 17, 1942, constitutes one form of fixture which may be used. The fixture 17, in each assembling section 18 and 19, is provided with assembling or guide pins 24, on which the various parts of the article are assembled.

The conveyor belt 15 is driven in any suitable manner across the top of the table 16 and may travel from right to left across the table to carry a series of fixtures 17 past a compressing station, where a compressing mechanism 20 may be operated.

The belt 15 travels along the table 16 and will carry the fixture 17 along with it, the fixture being guided by side rails 21 and 22 (Figs. 1, 5 and 6). The belt 15 is of the endless type and travels back beneath the table in a suitable guard frame 23 (Figs. 5 and 6) which is attached to the underside of the table 16.

Extending along the table 16 are a pair of channel members 27 and 28, the channel member 27 being disposed at the front of the table and the channel member 28 being disposed toward the rear thereof. The channel member 27 is suspended from the table by means of a plurality of support plates 29 and 30, which may be welded or otherwise suitably secured to the channel member and which are held in place on the front edge of the table by means of wood screws 31 (Figs. 1, 5 and 6). The rear channel member 28 is spaced from the table 16 by a spacer member 32 and has a series of bolts 33 threaded into its upper flange and extending through the table 16 and spacer 32, whereby the channel member 28 is suspended from the table. The lower flanges of the channel members are cut away to receive angularly disposed channel members 34, 35, 36 and 37 (Fig. 2), which form co-operating inclined trackways, the channel members 34 and 35 being in alignment and being disposed at the same angle as the channel members 36 and 37, which are disposed in the same plane. The channel members 34, 35, 36 and 37 serve as tracks to guide rollers 38, 39, 40 and 41, respectively, which are mounted for free rotation on the opposite ends of axles 42 and 43.

The axles 42 and 43 are secured to a rectangular framework, designated generally by the numeral 44, and comprising a pair of channeled trackways 45 and 46 and end plates 47 and 48, the axles 42 and 43 being fixed to the end plates 47 and 48. The rectangular framework 44 thus comprises a rigid framework in which a carriage, designated generally by the numeral 49, may travel.

The carriage 49 is constructed on the same general plan as the framework 44 and comprises a pair of angle members 50 and 51 rigidly interconnected by end plates 52 and 53. The end plates 52 and 53 have roller supporting axles 54 and 55, respectively, fixed to them and carrying rollers 56, 57, 58 and 59, which ride in the channel trackways 45 and 46. The angle members 50 and 51 have mounted on their horizontal flanges two channel members 60 and 61, in which wheels or rollers 62, 63, 64 and 65 may travel. The rollers 62 and 63 are mounted at the rear end of a compressor supporting frame 66, which is rectangular in shape, and the rollers 64 and 65 are mounted intermediate the ends of the compressor supporting frame 66. The compressor supporting frame comprises side members 70 and 71 extending from the rear of the frame to the front thereof and carrying projections 72, 73, 74 and 75 (Fig. 2), on which the rollers 62, 63, 64 and 65 are mounted. The side members 70 and 71 are spaced apart adjacent the rear end thereof by a spacer plate 76, which serves as a stop for engaging abutments 78 and 79 mounted on tie plates 80 and 81, which are fixed to the underside of the channel members 60 and 61 and carry the abutments 78 and 79 in the path of the plate 76 to limit the travel of the compressor supporting framework 66.

Intermediate the ends of the channel members 60 and 61, a pair of cylinder supporting plates 82 and 83 are fixed to the channel members to support a cylinder 84. The cylinder 84 is provided with trunnions 85 and 86, which extend into the cylinder supporting plates 82 and 83 to pivotally support the cylinder thereon. The cylinder 84 is designed to actuate a piston rod 87, which extends up between the channel members 60 and 61 and is pivotally connected in the forked end 88 of a bell crank 89. The bell crank 89 is oscillatable about a pivot pin 90 mounted in a slotted block 91 fixed to the undersides of the channel members 60 and 61. The left end (Figs. 5 and 6) of the bell crank 89 extends into the forked end of a clamp actuating plunger 92 and the forked end of the plunger 92 has slots 93—93 formed therein in which are slidable blocks 94 mounted upon a pin 95 which extends through the bell crank 89 and through the blocks 94. The pin 95 has washers 96 attached to its ends which serve to hold the blocks 94 in the slots 93. Thus, when the bell crank 89 is rocked about the pivot pin 90, the blocks 94 will raise or lower the plunger 92 and will slide within the slots 93 for a short distance. The plunger 92 extends upwardly through a tubular member 97, which is mounted upon a supporting block 98, in turn fixed to a block 99 mounted on the forward end of the channel members 60 and 61.

At its upper end, the tubular member 97 has fixed to it a lower clamp 105, which cooperates with a movable clamp 106 fixed on the upper end of the clamp actuating plunger 92. The tubular member 97 also supports a pair of handles 107—107, whereby the clamps may be moved as a unit to the right or left (Fig. 5) and to the right or left (Fig. 2). When the clamps 105 and 106 are moved to the right or left (Fig. 5), the framework 66 will travel in the channel members 60 and 61 and when the clamps are moved to the right or left (Fig. 2), the framework 66 and the carriage 49 will move together in the rectangular framework 44. In this manner, the clamps 105 and 106 may be moved into engagement with an article assembling fixture 17 which is travelling along on the belt 22 to position the clamp with respect to any one of a plurality of sub-assemblies 110 as carried on the fixture 17. It will be noted, by reference to Fig. 3, that the clamps are simultaneously associated with two adjacent sub-assemblies and, as will appear as the description progresses, the clamps will clamp the sub-assemblies under a definite pressure while assembling bolts 119 are threaded into the sub-assemblies.

The assembling fixture 17, as described in detail in the aforementioned co-pending application, is provided with two article assembling sections 18 and 19, one of which is normally positioned in a plane to be engaged by the clamps 105 and 106 when they are moved toward the table 16 and the other of which is mounted on pantograph levers 113 and 114, whereby it may be moved into position in direct vertical alignment with and above the article assembling section 19. As shown most clearly in Fig. 7 in dot and dash lines, the article to be assembled comprises a pair of retaining plates 115 and 116, between which are assembled a plurality of insulators 117 carrying conducting elements 118 and the two plates 115 and 116 are to be interconnected by bolts 119 passed through aligned apertures in the top retaining plate 116 and in the insulators 117 and threaded into threaded apertures in the plates 115. The upper clamp 106 is provided with a series of guide apertures 120, through which the bolts 119 may be dropped. In order to properly align the upper and lower clamps 106 and 105 and the article to be assembled, there is provided a loose guide detail 121, which may be used for this purpose. This detail comprises a plate 122 having a handle 123 and provided with a series of four guide pins 124—124. The guide detail 123 is adapted to be passed through suitable apertures 180 in the upper clamp 106, through aligned apertures 127 in the plates 116 and 115 and into apertures 181 in the clamp 105. The fixture 117 is also apertured to receive the pins 124 and the ends of the pins are reduced, as shown at 125, to enter the apertures 181 in the lower clamp 105. In this manner, the clamps 105 and 106 will be properly aligned with the article and after the bolts 119 are dropped into the apertures 120 in the upper clamp plate, any suitable screw driver, as illustrated by the screw driver bit 128, may be used to set the bolts 119 in place while the article is compressed between the clamps 105 and 106.

The clamps 105 and 106, which are shown in Fig. 5 in alignment with the assembling section 19, may be moved upwardly into association with the assembling section 18 by driving the framework 44 up the inclined channels 34, 35, 36 and 37 to move the clamps 105 and 106 to the level shown in Fig. 6. The framework 44 may be moved to this position by supplying fluid under pressure to a cylinder 130, which is mounted beneath the table 16, being pivotally mounted on a bracket 131. The cylinder 130 has a piston 132 therein to which is attached a piston rod 133, the opposite end of which is attached to a depending portion 134 of the axle 42. The piston rod 133 (Fig. 2) is threaded to receive stop members 135 and 136, which limit its travel due to their engagement with a cross head 137 mounted on the end of a pair of tie rods 138 and 139 suitably attached to the head of the cylinder 130.

The tubular member 97 has mounted upon it, in addition to the handles 107, a pair of push buttons 108 and 109, which control the flow of fluid under pressure to both of the cylinders 84 and 130. As shown in Fig. 4, the push buttons 108 and 109 control a pair of electric switches 140 and 141, respectively, connected in series to one side of a current source 142. As shown in Fig. 4, closure of both of the switches 140 and 141 will connect the current source 142 through a switch 143 to a solenoid 144. The solenoid 144 is connected to a valve 145 of the type which, on alternate operations of the solenoid, will connect a source of fluid under pressure through a pipe 146 alternately to a hose connection 147 and a hose connection 148, which are, in turn, connected to opposite ends of the cylinder 130. When the switch 143 is opened and a switch 149 is closed, the current source 142 will be connected through a solenoid 150 which will, on alternate operations, operate a reversing valve 151 to connect the pipe 146 alternately to a hose 152 and a hose 153, which are, in turn, connected to opposite ends of the cylinder 84. The switches 143 and 149 are mounted on a suitable bracket 154 and carry their actuating plungers 155 and 156 in the path of levers 157 and 158, respectively. The levers 157 and 158 have rollers 159 and 160 on their free ends for engagement by the compressor supporting frame 66 when the compressor supporting frame is pushed to its rear position, as shown in Fig. 6.

A better understanding of the invention will be had from the following brief description of the mode of operation of the apparatus embodying it. After insulators 117 carrying the conducting elements 118 and the retaining plates 115 and 116 have been assembled on the assembling pins 24 while the article assembling fixture 17 travels along with the belt 15, the fixture will arrive at the compressing station and, without interrupting the travel of the fixture along the conveyor, the sub-assembly 110 may be bolted together by threading the bolts 119 into the retaining plate 115 while holding all of the parts of the sub-assembly under compression. As the fixture 17 enters the compressing portion of the apparatus, the operator at that station may grasp the handles 107 and manually move the carriage 49 to the right (Figs. 1 and 2) to position the clamps 105 and 106 in alignment with the first two sub-assemblies 110 on the fixture in the assembling section 18, as illustrated in Fig. 6. As soon as the clamps 106 are pushed in a position substantially in alignment with the sub-assembly 110, the guide detail 121 may be slipped into place to assure the proper alignment of the clamps 105 and 106 with the sub-assembly 110 and the buttons 108 and 109 may then be pushed to their operated position to close the switches 140 and 141. As the clamps 105 and 106 are moved into position below and above the sub-assembly 110, switches 143 and 149 are operated by the engagement of the compressor supporting frame 66 with the rollers 159 and 160. When the switches 143 and 149 are operated, they are moved to the position opposite to that shown in Fig. 4 and thus the current source 142, upon closure of switches 140 and 141, will be connected to the solenoid 150. As soon as the guide detail 121 is slipped into place, the clamping jaws 105 and 106 will travel along with the fixture and when the push buttons 108 and 109 are operated, fluid under pressure will be admitted to the lower end of the cylinder 84 to compress the sub-assembly 110 while the bolts 119 are set in place and threaded into the retaining plate 115. As soon as the two sub-assemblies 110 between the clamps 105 and 106 have been fastened together, the push buttons 108 and 109 may be again operated to release the clamps and after the guide detail 121 is moved from the clamps, the clamps may be moved into association with the next two sub-assemblies 110 on the fixture 17. After all of the sub-assemblies 110 on the article assembling section 18 of the fixture 17 have been bolted together, the clamps 105 and 106 may be moved out to the outermost position, as shown in Fig. 5, and the push buttons 108 and 109 operated. When the clamps 105 and 106, together with the supporting frame 66, are moved to the outer position, as shown in Fig. 5, the switches 143 and 149 will return to their normal position, as shown in Fig. 4, and when the push buttons 108 and 109 are operated with the framework 66 in its outer position, current from the source 142 will be directed through the switches 140 and 141 and switch 143 to the solenoid 144 to supply fluid under pressure to the right end (Fig. 1) of the cylinder 130, thereby to move the rectangular framework 44 down the inclined trackways formed by the channels 34, 35, 36 and 37, thereby to associate the clamps 105 and 106 with the assembling section 19 of the fixture 17.

After all of the sub-assemblies 110 on the assembling section 18 have been bolted together, the assembling section 18 may be pushed to the position shown in Fig. 5 and the sub-assemblies 110 on the assembling section 19 will then be accessible to the clamps 105 and 106. Thereupon, the clamps 105 and 106 may be pushed into association with the sub-assemblies 110 on the section 19 of the fixture 17 and the operations described in connection with section 18 may be repeated. It will be understood that all during the time the hereinbefore described operations have been taking place, the fixture 17 is travelling along with the belt 15 and its travel need not be interrupted while the sub-assemblies 110 carried by the fixture are compressed and the parts thereof attached together by running down the bolts 119.

What is claimed is:

1. In an assembling apparatus, compressing means engageable with articles for compressing them while they are secured together, means for actuating the compressing means, a supporting frame for supporting the compressing means and its actuating means, a carriage, means on the carriage for slidably supporting the frame for movement with respect to the carriage, a framework, means on the framework for supporting the carriage for movement with respect to the framework, and inclined trackways for supporting the framework for movement at an angle to the horizontal.

2. In an assembling apparatus, compressing means engageable with articles for compressing them while they are secured together, means for actuating the compressing means, a supporting frame for supporting the compressing means and its actuating means, a carriage, means on the carriage for slidably supporting the frame for movement with respect to the carriage, a framework, means on the framework for supporting the carriage for movement with respect to the framework, inclined trackways for supporting the framework for movement at an angle to the horizontal, and means for moving the framework on the inclined trackways.

3. In an assembling apparatus, compressing means engageable with articles for compressing them while they are secured together, means for actuating the compressing means, a supporting frame for supporting the compressing means and its actuating means, a carriage, means on the carriage for slidably supporting the frame for movement with respect to the carriage, a framework, means on the framework for supporting the carriage for movement with respect to the framework, inclined trackways for supporting the framework for movement at an angle to the horizontal, means for moving the framework on the inclined trackways, and a common control means for the compressing means and the means for moving the framework.

4. In an assembling apparatus, compressing means engageable with articles for compressing them while they are secured together, means for actuating the compressing means, a supporting frame for supporting the compressing means and its actuating means, a carriage, means on the carriage for slidably supporting the frame for movement with respect to the carriage, a framework, means on the framework for supporting the carriage for movement with respect to the framework, inclined trackways for supporting the framework for movement at an angle to the horizontal, means for moving the framework on the inclined trackways, a common control means for the compressing means and the means for moving the framework, and means operable by the supporting frame for rendering the control means effective to control the means for actuating the compressing means.

5. In an assembling apparatus, compressing means engageable with articles for compressing them while they are secured together, means for actuating the compressing means, a supporting frame for supporting the compressing means and its actuating means, a carriage, means on the carriage for slidably supporting the frame for movement with respect to the carriage, a framework, means on the framework for supporting the carriage for movement with respect to the framework, inclined trackways for supporting the framework for movement at an angle to the horizontal, means for moving the framework on the inclined trackways, and a control means for selectively controlling either the operation of the compressing means or the means for moving the framework under control of the supporting frame.

6. In an assembling apparatus, compressing means engageable with articles for compressing them while they are secured together, means for actuating the compressing means, a supporting frame for supporting the compressing means and its actuating means, a carriage, means on the carriage for slidably supporting the frame for movement with respect to the carriage, a framework, means on the framework for supporting the carriage for movement with respect to the framework, inclined trackways for supporting the framework for movement at an angle to the horizontal, means for moving the framework on the inclined trackways, switches mounted on the carriage to be operated by the supporting frame in one position, and a manually controlled circuit selectively controlled by said switches to control the operation of the compressing means and means for moving the framework.

EUGENE L. MALHIOT.